(12) United States Patent
McCall

(10) Patent No.: US 9,595,204 B2
(45) Date of Patent: Mar. 14, 2017

(54) RELATIONSHIP PERFORMANCE SYSTEM AND METHOD

(76) Inventor: Danny McCall, Loudon, TN (US)

( * ) Notice: Subject to any disclaimer, the term of this patent is extended or adjusted under 35 U.S.C. 154(b) by 880 days.

(21) Appl. No.: 12/269,840

(22) Filed: Nov. 12, 2008

(65) Prior Publication Data

US 2009/0197227 A1   Aug. 6, 2009

Related U.S. Application Data

(60) Provisional application No. 60/987,285, filed on Nov. 12, 2007, provisional application No. 61/113,516, filed on Nov. 11, 2008.

(51) Int. Cl.
*G09B 19/00* (2006.01)
*A63F 3/02* (2006.01)
*A63F 3/00* (2006.01)

(52) U.S. Cl.
CPC .............. *G09B 19/00* (2013.01); *A63F 3/00* (2013.01); *A63F 3/02* (2013.01)

(58) Field of Classification Search
CPC .................................... A63F 3/02; A63F 3/00
USPC .................................................. 434/236, 238
See application file for complete search history.

(56) References Cited

U.S. PATENT DOCUMENTS

| | | | | |
|---|---|---|---|---|
| 2,717,157 A | * | 9/1955 | Dylewski | A63F 3/0434 273/243 |
| 3,779,557 A | * | 12/1973 | Kritzberg | A63F 3/0423 273/272 |
| 3,883,142 A | * | 5/1975 | Spohn | A63F 3/00088 273/251 |
| 3,889,955 A | * | 6/1975 | Welch | A63F 3/00138 273/257 |
| 4,012,045 A | * | 3/1977 | Vail | A63F 3/00138 273/257 |
| 4,016,939 A | * | 4/1977 | Thron | A63F 3/00145 273/244 |
| 4,045,031 A | * | 8/1977 | Arnold | A63F 3/00138 273/257 |
| 4,068,848 A | * | 1/1978 | Lichtman | A63F 3/00072 273/257 |
| 4,484,748 A | * | 11/1984 | Becze | A63F 3/0457 273/256 |
| 4,706,960 A | * | 11/1987 | Nowacki | A63F 11/0011 273/148 A |
| 4,878,675 A | * | 11/1989 | Perry | A63F 1/10 273/243 |
| 5,071,134 A | * | 12/1991 | Burroughs, Jr. | A63F 3/00006 273/249 |

(Continued)

*Primary Examiner* — Robert J Utama
(74) *Attorney, Agent, or Firm* — Wayne Edward Ramage; Baker Donelson

(57) ABSTRACT

An apparatus for negotiating a work role relationship between two participants, comprising a Dialog and Agreement Board with multiple in-dialog areas where participants place one or more cards representing elements or parts of the work role relationship or personal characteristics related to the work role, and with a commitment area upon which cards can be taken from the in-dialog areas and placed to represent agreed-upon commitments by the participants. An agreement between the participants may be documented manually or automatically, in whole or in part. Components marked with bar codes can be read for entry into a computer program for documenting agreements.

7 Claims, 11 Drawing Sheets

(56) References Cited

U.S. PATENT DOCUMENTS

| | | | | |
|---|---|---|---|---|
| 5,137,279 | A | * | 8/1992 | Murphy .............. A63F 3/00138 273/257 |
| 5,244,391 | A | * | 9/1993 | Bryant ................ A63F 3/00006 273/243 |
| 5,280,912 | A | * | 1/1994 | Porter ................ A63F 3/00031 273/244 |
| 5,478,086 | A | * | 12/1995 | Aylett ................ A63F 3/00006 273/243 |
| 5,499,818 | A | * | 3/1996 | Allal ...................... A63F 3/001 273/161 |
| 5,816,573 | A | * | 10/1998 | Bolling, Sr. .............. A63F 3/00 273/266 |
| 5,876,211 | A | * | 3/1999 | Schmoyer ........... A63F 3/00006 273/243 |
| 6,416,055 | B1 | * | 7/2002 | Shaw, Sr. ............ A63F 3/00138 273/243 |
| 6,527,272 | B1 | * | 3/2003 | Conner .............. A63F 3/00006 273/243 |
| 6,805,351 | B2 | * | 10/2004 | Nelson .......................... 273/257 |
| 7,749,060 | B1 | * | 7/2010 | Olmes, III ................ A63F 3/00 273/273 |
| 7,975,928 | B2 | * | 7/2011 | Elwell .................... G09B 5/062 235/375 |
| 8,128,409 | B2 | * | 3/2012 | Feller ....................... A63F 9/18 434/236 |
| 2004/0100023 | A1 | * | 5/2004 | Nelson ............... A63F 3/00157 273/257 |
| 2007/0129123 | A1 | * | 6/2007 | Eryou .................... A63F 13/12 463/1 |

* cited by examiner

Talent Steward

Checklist

Name: _____

A. Preparation:

Suggested: Read Career Fulcrum.

☐ 1. Read Relationship Weaver Instruction Manual. Refer to the Dialog and Agreement Board (DAB) sample on reverse side whenever necessary. Seek assistance as needed.

☐ 2. Seek input from applicable organizational leader(s) regarding any requirements that must be present in the Agreement. This may exist in the DGS of the Work Role Design. (Talent Steward's responsibility.)

☐ 3. From the Common Element Inventory List review and select applicable Common Elements. Once done, extract these Common Elements from their holder.

☐ 4. Consider and create applicable Specific Elements. Be comprehensive in thoughts and succinct in words.

☐ 5. From Durables Inventory List review and select applicable Durables. Once done, extract these Durables from their holder (min. 10, max. 20).

☐ 6. Consider what, if any, of your Elements are absolute "Imperatives" (must have, non-negotiable) and keep them separated.

☐ 7. Consider what Key Indicators may be practical measurements as to the quality, strength, and status of the Agreement in the future. Make a written list of these ideas for collaboration during Dialog.

☐ 8. Keep a written list of all Common and Specific Elements, as well as Durables you will be using during Dialog. This may be the same list as where you note your Imperatives, if applicable, and your ideas for Key Indicators.

I have these pre-dialog comments, concerns or suggestions (additional paper may be used if needed):

_____

*I have completed the above.*
Sign or initial: _____ Date: _____

B. Dialog:

☐ 1. Arrive on time and with the intent of building a successful, rewarding relationship for both parties. Ensure Dialog environment is free from distractions or bias to either party.

☐ 2. Place chosen or created Durables and Common/Specific Elements on the DAB
 - Durables are placed into the other party's Durable area.
 - Elements are place as marked on DAB into respective In Dialog zones.
 - Elements, as applicable, are placed into the Imperative Commitment area.

☐ 3. Take position at the DAB. Carefully and thoughtfully review all Elements in your area as well as any Elements placed in the Imperative area. Discuss as needed.

☐ 4. Choose Elements that are readily acceptable and place into applicable Commitment areas. Dialog as needed. If applicable, move "conflicting" Imperatives to Danger zone. Dialog as needed.

☐ 5. Examine the Durables in your area and carefully consider potentially important differences in these versus what you offered. Utilize the Durables Evaluation Mat to assist in assessing differences and similarities. Discuss as needed. If unresolved to your satisfaction *and* of a very serious concern, place applicable Durables into other party's Danger zone.

☐ 6. Dialog, collaborate, negotiate and compromise on all Elements to construct Commitments each party requires to form and sustain a mutually-rewarding Agreement. Move Elements in and out of Commitment areas as necessary. Use "Calls" as required. Constructively and creatively attempt to resolve all Elements placed in the Danger zones. It is normal that many Elements remain in the In Dialog area. For Contingent and Tentative Commitments, attach notes using the Weaver Notepad.

☐ 7. Seek third party assistance if chronic problems, issues or irreconcilable differences exist. Use cool-off periods and time-outs if needed.

*See sample Dialog and Agreement Board on reverse.*

C. Agreement:
Relationship Weaver

☐ 1. Review and ensure that each party "Validates" all Elements in all Commitment areas.

☐ 2. Make a best final attempt to address any Elements in Danger area including incongruities in Durables deemed to be of a problematic nature. If the attempt fails, consider third party assistance, a period for reflection and counsel, or other creative options and alternatives prior to forming Agreement.

☐ 3. Collaborate on Key Indicators, reach resolution and place into Imperatives area. (Minimum of 1 per Triangle corner for each party's respective Triangle; Maximum of 3 per respective Triangle corner.)

☐ 4. Once both parties are satisfied with the Agreement Commitments, seal Agreement by a congratulatory and promise-binding handshake.

☐ 5. Capture and document all information on the DAB, including all Commitments, Durables and items left in "In Dialog" or Danger zones (Talent Steward's responsibility). Distribute information afterwards.

☐ 6. Once documentation is complete, re-sort, package and properly return all components to storage area.

*We want your thoughts and ideas! Please provide a candid and confidential assessment regarding the following areas:*

The other party was well-prepared for the Weaver *(circle one)*

*Agree*   1   2   3   4   5   *Disagree*

This process improves our work role relationship *(circle one)*

*Agree*   1   2   3   4   5   *Disagree*

My suggestions, comments, or constructive criticisms are (use additional paper if needed):

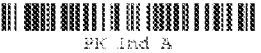
FIGURE 8

RELATIONSHIP PERFORMANCE SYSTEM AND METHOD

RELATIONSHIP PERFORMANCE SYSTEM AND METHOD

This application claims priority to Provisional Patent Application No. 60/987,285, filed Nov. 12, 2007, entitled "Relationship Performance Game System and Method," and Provisional Patent Application No. 61/113,516, filed Nov. 11, 2008, entitled "Relationship Performance System and Method," and is entitled to those filing dates for priority. The complete disclosures, specifications, drawings and attachments of Provisional Patent Application Nos. 60/987,285 and 61/113,516 are incorporated herein in their entireties by reference.

FIELD OF INVENTION

This invention relates to a system and method for teaching and training operable methods for increased relationship performance.

BACKGROUND OF INVENTION

The workplace affiliation between an organization and its workers (or the employer and its employees) during much of the industrial age was generally based upon models that can be loosely referred to respectively as paternalism (employer) and loyalty (employee). This model of affiliation has substantially shifted over the last decades, due to variety of societal and economic reasons, to an affiliation based more severely and purely upon the value or yields each party gains, or expects to gain, from the relationship.

However, each party determines and defines the value they seek with significant, if not total, difference. In other words, though successful work relations are based upon each party's reciprocal gain, there are disparate requirements from each party that must be satisfied to form and sustain successful workplace relations. These generally symbiotic relations include severely contrasting requirements of each party that are multifaceted, some being absolute in nature while others are relative to other options each party may possess at any given moment. Typically the requirements of both parties are fluid and changing with the passage of time.

Formal and mutually compatible perspectives and a responsive means to apply them are sorely missing from organizational method and practice, and equally from personal literacy in today's workplace. Accordingly, what is needed is a system and method to diagnose, design, deploy, and manage a work role in the context of the complex modern relationship or affiliation existing between the organization and worker, and to assist an organization and worker to fashion an agreement as to the work role.

BRIEF DESCRIPTION OF THE DRAWINGS

FIG. 4 is a view of a checklist in accordance with one embodiment of the present invention.

FIG. 7 shows various examples of Specific Elements cards in accordance with one embodiment of the present invention.

FIG. 8 shows various examples of Key Indicator cards in accordance with one embodiment of the present invention.

DETAILED DESCRIPTION OF EXEMPLARY EMBODIMENTS

Figure 1:
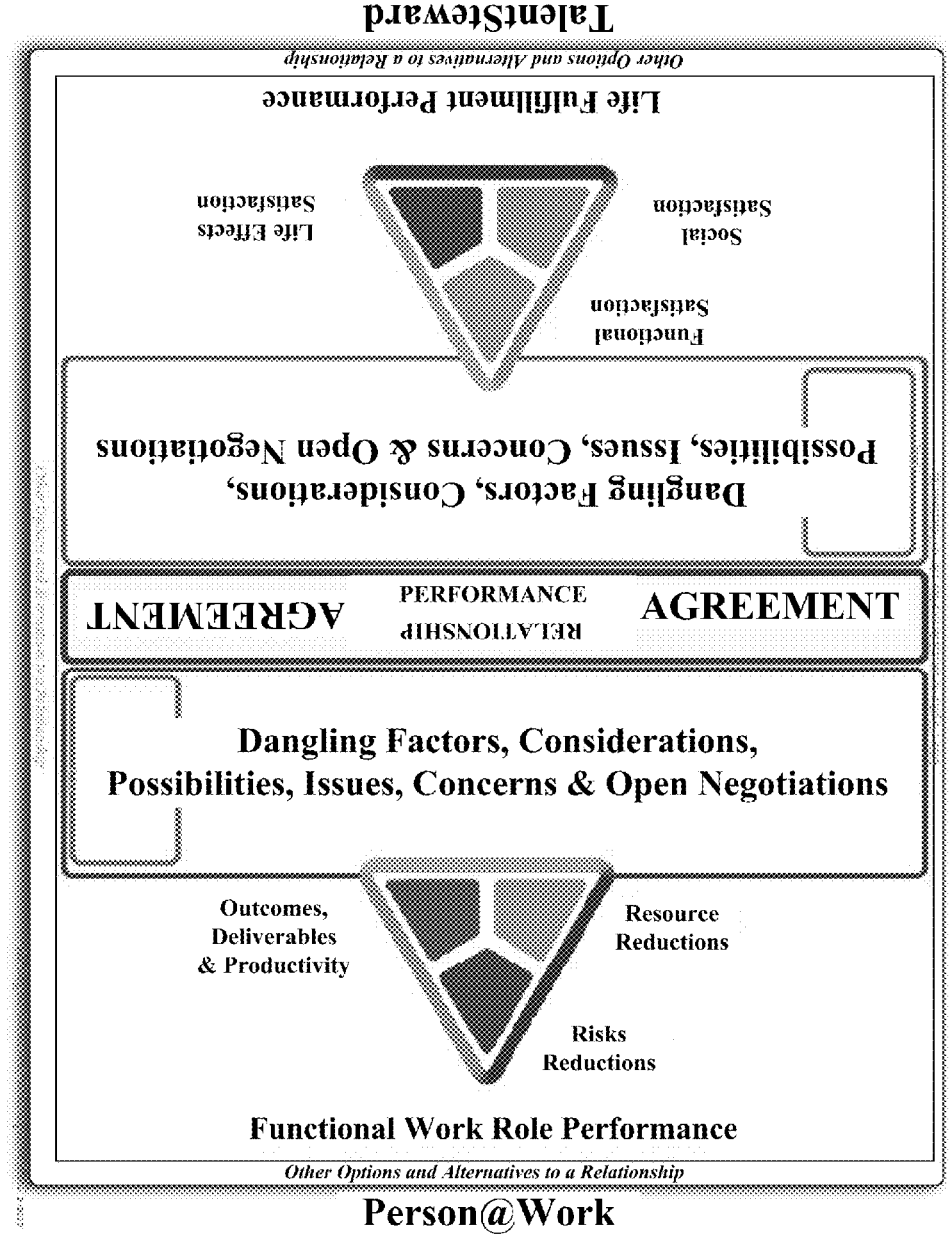
FIG. 1 is a top view of a board in accordance with one embodiment of the present invention.
Figure 2A:
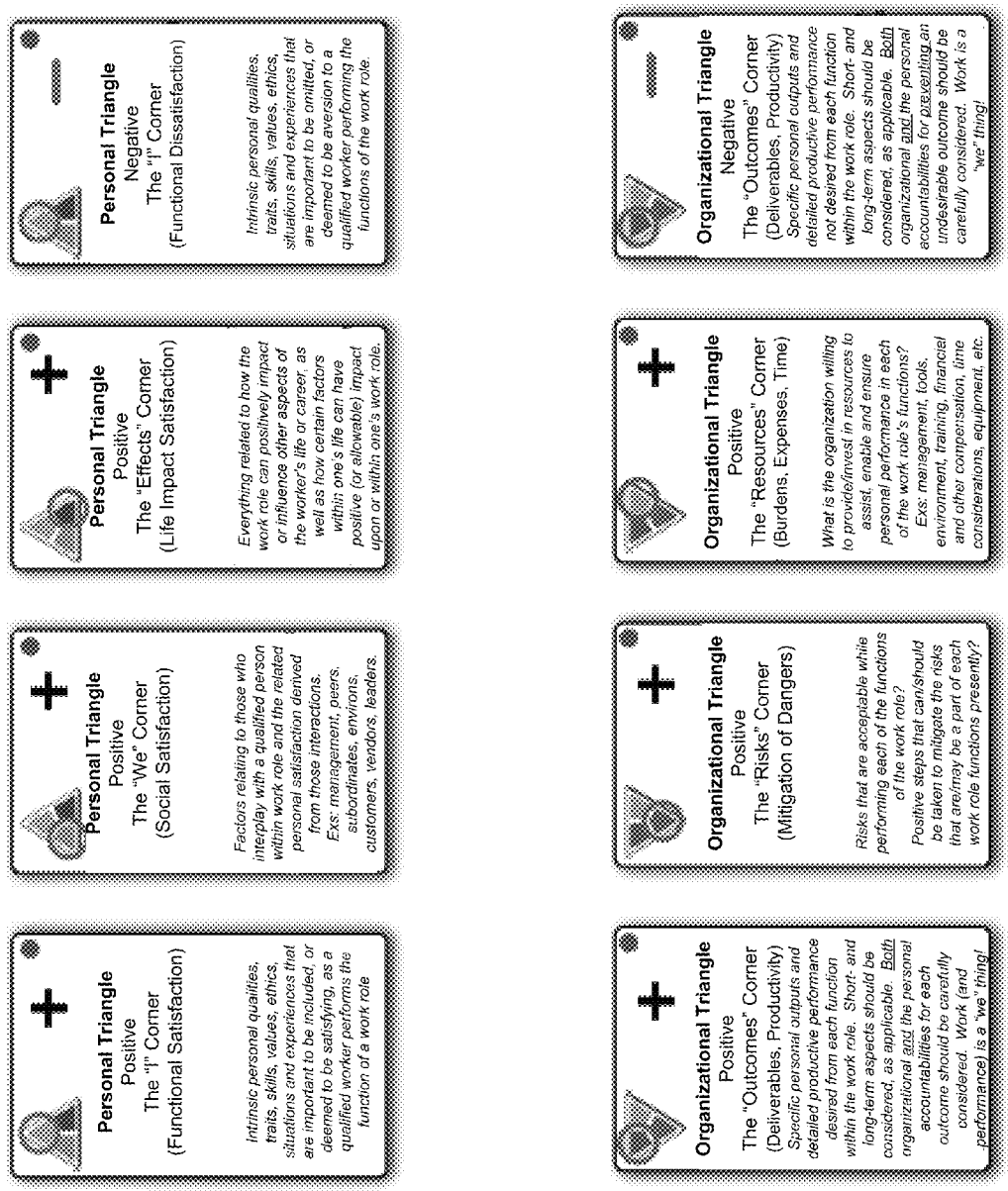
FIG. 2 is a top view of card elements in accordance with one embodiment of the present invention.
Figure 2B:
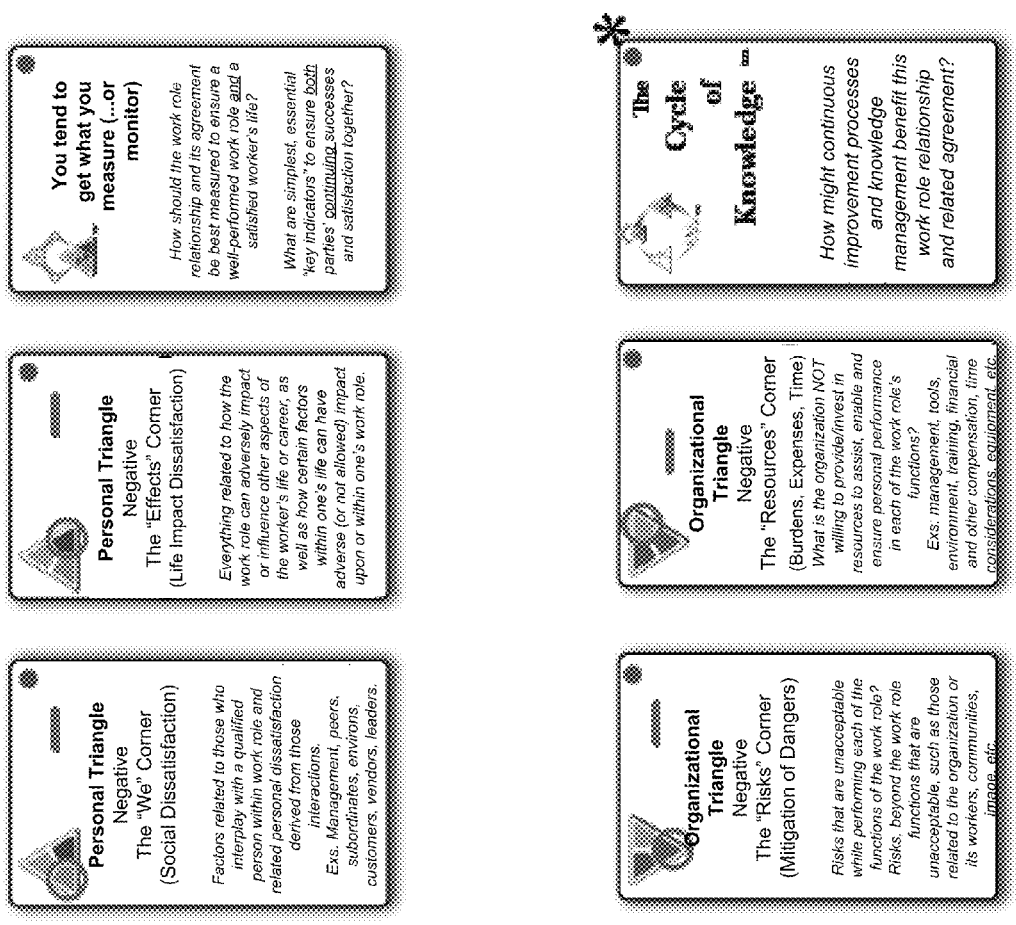

At the heart of work roles are special forms of relationships existing between workers and organizations. It is vital that both parties are able to design and sustain a healthy affiliation and do so in a practical and effective manner. The most reliable method of accomplishing such an important function is by reliably "weaving" together the respective requirements, expectations and responsibilities of both parties into a single "Agreement." A work role relationship should be based upon a well-designed, easily referenced Agreement.

In one exemplary embodiment, the present invention enables both workers and organizations to better understand the many dimensions and complexities of their relations, and with this knowledge, to seek a sustainable Agreement in order to realize greater respective rewards. To this end, the present invention comprises a shared platform for the use of both parties in creating and sharing information, engaging in "Dialog," then reaching Agreement. Afterwards, each party has the direction and obligation to consistently be attentive to meeting the "Commitment" of their Agreement. As time passes, when either party desires or needs to modify or refine the Agreement, they can simply return to the system and method of the present invention.

The system of the present invention provides a structured and neutral instrument that enables both parties to be more attentive and responsive to each other. It can shape more constructive points of view in both parties and in doing so, significantly improve workplace communications. It can be used anytime there is a need or reason for either party to have discussions about improvements, concerns, remedies or new ideas related to the work role. It can guide feedback discussions as to how each party is performing for the other. It can also be useful in the hiring and selection processes. It can be applied everyday throughout the workplace and can be effective in sharing information related to successions, exits and transitions. It also may be a tool that can be applied for work role diagnostics in a wide variety of workplace situations. It can be utilized as an apparatus for preparatory training and development simulations, as well as generating greater knowledge about work role relationships in programs of continuous improvement.

Through thoughtful, consistent and disciplined usage of various embodiments of the present invention, rewarding work role relationships can be developed, stewarded, repaired or improved. It is designed to be flexible and adaptable for use in a manner that is best suited to workers, organizations and their various constituents, including usage in forming more predictable relations with candidates. It is designed for ease of use, simplicity and lasting impact. It allows both parties to create the Elements and rules that work well in a wide range of situations and applications. The Weaver can be applied in a variety of circumstances: one-to-one; solitary; one-to-many; or many-to-many, such as in team or collective group applications. The system offers a dependable platform to assist all those in the workplace with the opportunities and challenges they have each day which are related to forming and sustaining optimal work role relationships.

The system can be used in an extremely wide variety of situations and circumstances that relate to work role relationships. In one embodiment, the system may be used for forming, discussing and improving work role relations between an authorized, qualified representative of an organization and a worker (or candidate). Each party should have an authentic interest in and attention to pursuing, improving, and/or maintaining a reward, high-quality work role relationship with the other party. In the circumstance involving organization and worker/candidate interaction, the two parties typically assume one of two roles when using the present system: (1) Talent Steward; and (2) Person@Work. Talent Steward typically includes managers, supervisors, recruiters, or leaders who are attentive and responsible for sustaining and/or forming healthy work role relations with a person or people within a specific work role. A Person@Work is a person within a work role, or a candidate seeking and considering a work role.

In one embodiment, it is preferred that each party have a good working understanding of the basic principles and frameworks of Relationship Performance. This knowledge is of great benefit when using the present invention as a platform and tool for creating and conducting optimal workplace relations. This knowledge can be achieved by reading materials with regard to Work Role Yields Management, or having been otherwise instructed in Relationship Performance. Work Role Yields Management is fully described in U.S. patent application Ser. No. 11/772,026, filed Jun. 29, 2007, and U.S. Provisional Patent Application No. 60/806,145, filed Jun. 29, 2006, both entitled "WORK ROLE YIELDS MANAGEMENT SYSTEM AND METHOD," the disclosures, specifications, drawings, claims, appendices, and attachments of both of which are incorporated herein by reference in their entireties for all purposes.

Figure 3:
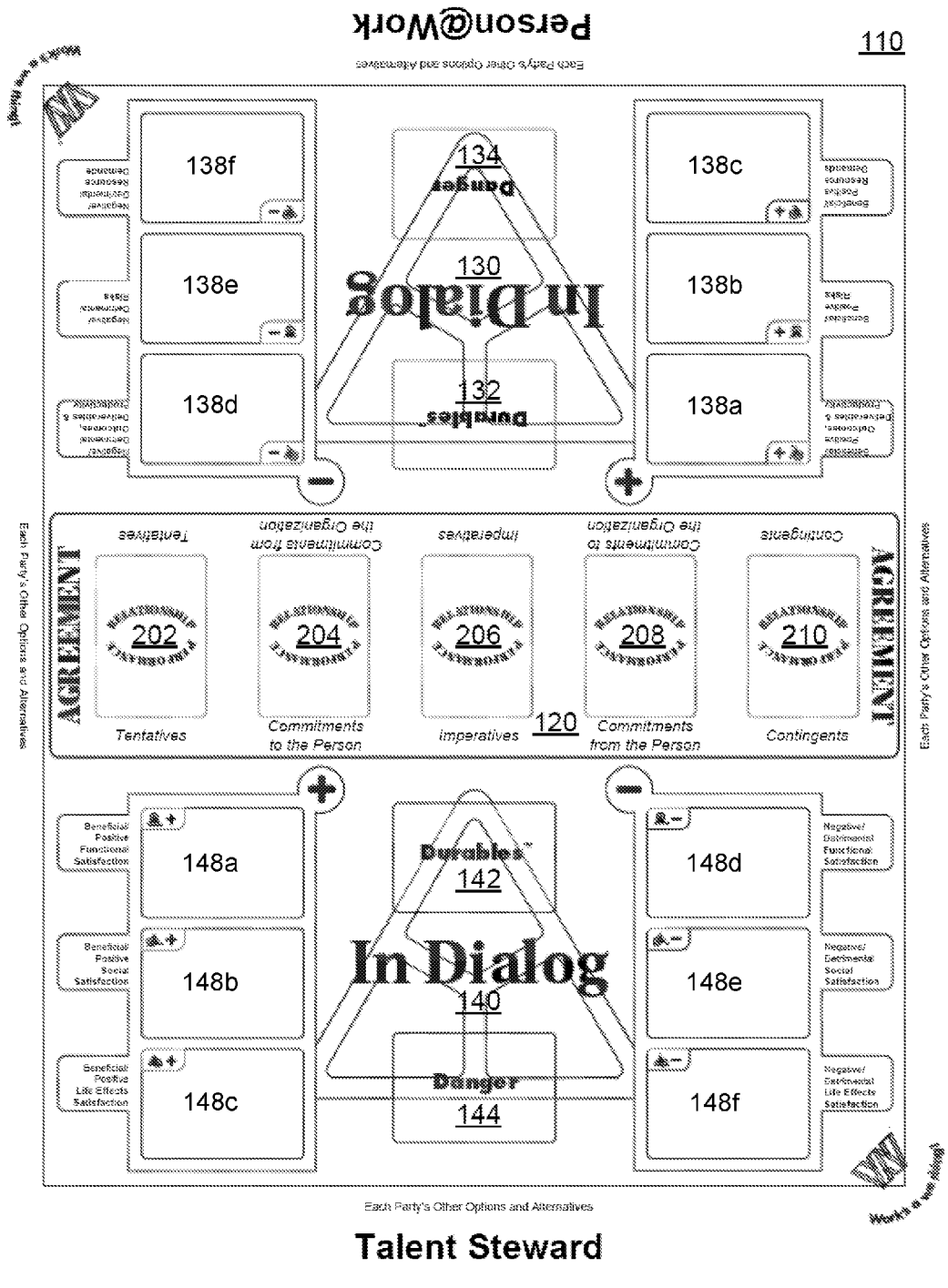
FIG. 3 is a top view of another embodiment of a board.

In one exemplary embodiment, the system comprises a three step process: Preparation; Dialog; and Agreement. In this process, the system comprises three basic components: Elements (specific proposed needs and aversions shared about the work role relationship) (see FIGS. 6-8); Durables (preferences and qualities that may be applicable to work role satisfaction and performance) (see FIG. 9); and the Dialog & Agreement Board (a neutral structure for conversation, commitment and agreement) (see FIG. 3). In one exemplary embodiment, Elements and Durables are represented on two-side cards, which can be selected and placed in various locations on the Dialog & Agreement Board.

In this embodiment, during use of the present invention, both parties form an Agreement with each other as a basis for a rewarding work role relationship. They do so by collaborating on the quantity and quality of Commitments to ensure that the needs of both parties are met. Commitments are made up of Elements that each party submits to their Dialog and become accepted by both parties. During Dialog, Durables offer additional clues for predicting opportunities and potential problems that may arise in the relationship. The Dialog & Agreement Board is used to help the parties engage in Dialog and come to an Agreement.

In the Preparation stage or step, each party prepares by selecting, creating and defining the Elements that they believe should be part of the work role. These specifically describe their respective requirements or offerings to a work role relationship. Initially, since Elements are only the proposals of each party, they represent the "raw materials" or potential "fibers" that may ultimately be used in weaving a relationship Agreement. During Preparation, each party also chooses a limited number of Durables that serve to illustrate factors that may benefit work role satisfaction and performance.

The Preparation stage is important to success in the Dialog phase. Lack of preparation can result in a cascade of suboptimal or negative consequences in the relationship. For some, there will be inevitable temptations to short-cut or abbreviate the Preparation process and go directly into Dialog, but doing so should be avoided. Furthermore, failure to fully prepare for Dialog also reflects a degree of disrespect for the other party who is also preparing and may imply that the party does not place importance on the work role relationship.

In one embodiment, there are two general Preparation functions each party should perform prior to Dialog interaction: (1) creating and choosing Elements; and (2) choosing Durables.

Elements are the "parts" of a successful and satisfying work role relationship. Elements are a means to break the relationship into its most basic and specific Commitments for better communications and more informed dialog and decision-making. Elements address what each party initially proposes to be considered as a part of a work role relationship. Elements will not be fully complete until Dialog occurs and both parties offer their Elements. However, each party needs to come to Dialog with Elements describing all that they foresee they will need from the work role relationship and what they may offer to the relationship. During Dialog the two parties will propose, discuss and decide what Elements will be a part of the Commitments in the work role relationship. Mutually accepted Commitments will represent what each party agrees to in the work role relationship. Therefore, during Preparation, each party should comprehensively envision what "Elements" they desire to be considered or included within a highly rewarding relationship that would ensure significant satisfaction and success for both. Each party will use their respective Elements during Dialog to discuss, collaborate, negotiate and construct the basis for a strong, long-lasting relationship.

In one embodiment, all Elements are identified by pertinent Organizational Triangle and Personal Triangle categories to assist in the thought, dialog and later knowledge management of each party. For information that may apply to more than one area or context of the Triangle frameworks, a reasonable attempt should be made to put it into the most applicable area based upon the user's subjective perspective. It is permissible to place the same information into multiple areas if the user feels strongly that it belongs there, for this too provides valuable information. What is important at all times is to communicate completely, accurately and in a manner so that both parties have clear understanding.

Succinctness and brevity is valued, as long as there is enough information for understanding and avoiding the potential of any confusion. There should be no reliance on any assumptions or any trusting of "implicit" information.

Figure 6:
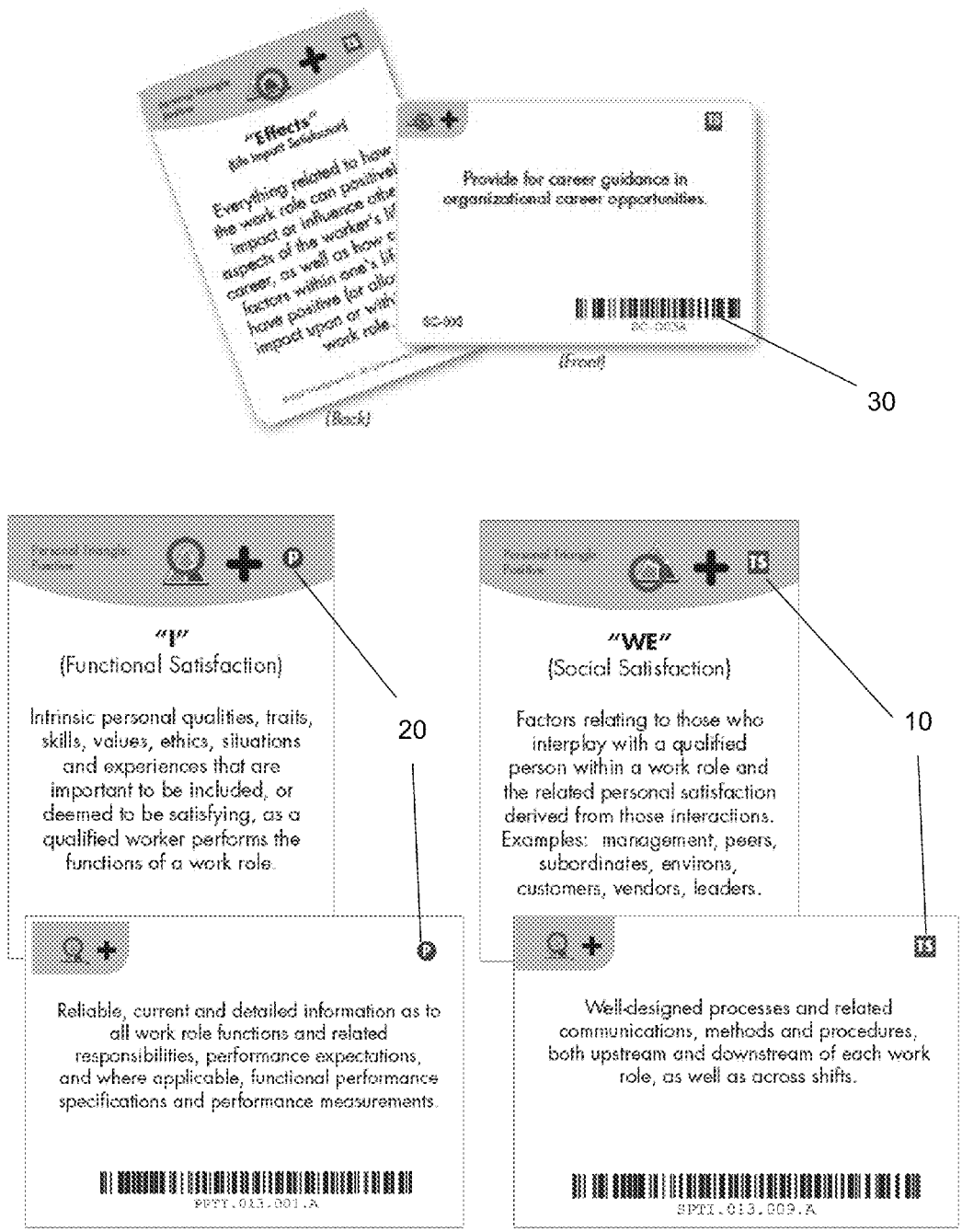
FIG. 6 shows various examples of Common Elements cards in accordance with one embodiment of the present invention.

In one embodiment, each party's Elements are contained on cards, and as shown in FIG. 6, may be identified by a square with "TS" 10 for Talent Steward and a round circle with "P" 20 for Person@Work. Other icons or symbols may be used. This will allow each party to quickly see who submitted what. Each Common Element may be uniquely numbered, and all Elements may have barcodes 30 for ease of automated documentation and record keeping.

In one particular embodiment, there are three basic types of Elements: Common, Specific, and Key Indicator. As seen in FIG. 6, Common Elements represent information that is often more universal in nature and ready-for-dialog if applicable to the situation. These Elements have content already in place on both surfaces for the consideration and use by either party. In some cases, the organization may add its own Common Elements which can be used by either party also. Common Elements provide the parties with "pre-made" Elements that tend to be common to many work roles and people needs. They are not all inclusive by any means and they may or may not be directly and accurately suitable for party use.

Figure 7:
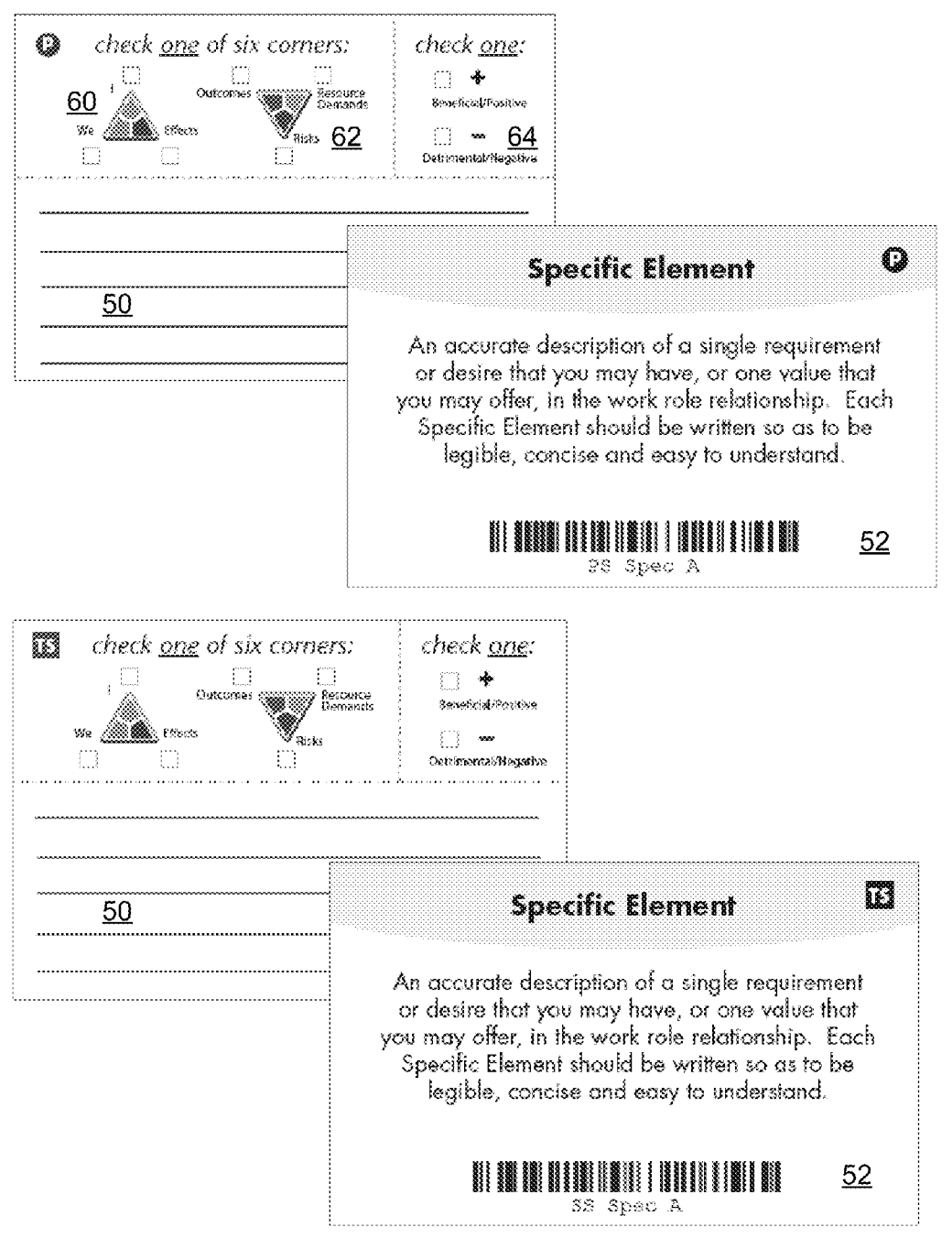

Specific Elements, as seen in FIG. 7, have one surface or side blank or with lines for writing 50 and therefore available for each party to construct and communicate their own information content. The other side may have a short description 52 of what a Specific Element is. In some cases, the organization may author, provide and instruct the Talent Steward or Worker in certain Specific Elements based on pre-existing work role design or workplace circumstances.

Specific Elements should be written so as to be legible, concise, easy to understand and very explicit. Each should convey enough information for substantive discussion based on shared understanding. Since space for sharing information is limited upon Specific Elements, either party can use a Specific Element to refer to (or be a summary representation, proxy, symbol or synopsis of) another greater, larger and more comprehensive document, specifications, or other information that both parties can access or review, before or during Dialog. In these situations, such documents should be aligned or compatible with the Element's contextual Triangle framework as much as possible and reasonable. General, non-specific documents or documents lacking context are not advised; rather these should be broken into pertinent contexts that are aligned with Elements, if at all possible. The Specific Element that refers to the supporting documentation may benefit by including summary information to "remind" parties as to the subject matter and topic during their Dialog. In such situations, all applicable documents should also be brought to Dialog so as to be available for review and consideration.

In one embodiment, the Specific Elements cards contain Personal 60 and Organizational 62 Triangles, whose applicable corners should be marked for the Specific Element written on the card. The participant also may indicate whether the Specific Element is positive/beneficial or negative/detrimental 64.

Common Elements may also offer a degree of insight, instruction, and reference that parties can use in creating Specific Elements. On the other hand, Specific Elements allow the user to be exact and precise in describing what they need or desire from the relationship and what they may potentially offer to the relationship. Either Common or Specific Elements may also be an "Imperative" for a party. That is, the party simply must have its existence in the work role. An Imperative is a "must-have" or "non-negotiable." Care should be used in defining an Imperative Element and should only be used if absolutely true.

During Preparation each party should create and choose a combined set of Common and Specific Elements that offers a complete presentation of what they seek from the relationship and what they offer to the relationship. Each party should distribute their thoughts and attention to the full span and context of the work role's Personal 60 and Organizational Triangles 62 since this is the realistic scope of any work role. Both positives and negatives (what is needed and what should be avoided or considered to be a detriment) of each Triangle corner should be explored, considered and articulated through the use of Elements.

Talent Stewards have the responsibility of seeking input from applicable organizational leader(s) regarding their perspectives and expectations of the work role. Leaders may have specific requirements pertaining to Elements that must be included in the Dialog & Agreement process. This may take into consideration Elements deemed as "Imperatives" by the organization. The Talent Steward should also refer to any Deployment and Guidance Specifications (DGS) that may exist within the Work Role's Design (if the organization is fully practicing Work Role Yields Management in the work role).

Each party should strive to be as thoughtful and thorough as possible in the choice and construction/creation of the Elements of the relationship from their perspective. All aspects of the Personal Triangle, Organizational Triangle and Eight Dimensions frameworks should be considered. Each party should completely express what they need as well as desire or prefer from the work role through the use of Elements and their respective Triangle. Therefore, at a minimum, there should be ample and complete Elements in all areas of a party's own Triangle.

Equally, whatever each party envisions they can potentially offer to the other party should be expressed through the other party's Triangle. In fact, during Dialog this can be an important "value proposition" to better enable and leverage oneself in getting what is needed from the relationship. Therefore, the compelling Elements that a user has in Preparation to address each area of the other party's Triangle is empowerment in Dialog as well as in the relationship.

Any Common or Specific Elements that are deemed to be Imperative in their nature (absolute must-haves, non-negotiable) should be set aside separately, since these will be placed separately as the parties begin Dialog. A test as to whether an Element is truly an Imperative is asking the question: "If I do not have this, am I willing to forego, forget, not pursue or quit/exit this work role relationship?" If the answer is "Yes" it is probably an Imperative. If the answer is truthfully "No," then it probably is not. Generally Imperatives for workers directly correlate with Personal Triangle "Screamers." Equally, if an Element is an Imperative, the party should present it as such, up front. Imperatives are the most serious of all the Elements. They should be used with care, but whenever applicable.

At a minimum, a worker or candidate should use their self-knowledge to identify all the factors related to their qualities and preferences within the role that may place them into the positive and negative "Flow" zones and then articulate these clearly through their Elements. The Flow zone is the area where a worker will be the most satisfied and typically perform the best as well. A person should also clearly articulate their positive and negative Screamers (as Imperatives) and Core Personal Triangle factors. The Personal Work Role Experience Assessment may be used in determining these Elements.

The Talent Steward should comprehensively cover the full span of the Organizational Triangle for the work role as related to its functions, environments and communities. At a minimum, a Talent Steward should be prepared to present Elements that include the following:

a. Each specific function that is desired to be performed within the work role (in order to gain the yields the organization seeks from that work role). Every work role function should be presented and described as a separate Element to ensure optimal understanding, acknowledgement, discussion and Agreement.

b. Explicit performance responsibilities of the worker for the functions. This should include each personal quality, attribute and factor the organization depends upon or requires for functional performance.

c. Explicit performance responsibilities of the organization for the functions. This may include both Resources and Personal Triangle factors that are, or will be offered, to facilitate, support, enable and compensate the work role's performance. The Talent Steward is advised to present all Personal Triangle Elements in place, offered or available to be offered, as compensation in this work role. The work role and its design and execution are the responsibility of the organization and the Talent Steward. The Talent Steward is the broker in Relationship Performance. For each function the organization shares performance responsibilities.

In one exemplary embodiment, there should be equal attention in creating information to address both the positive and negative factors related to Elements (that which is not desired to be gained, or what is preferred not to be offered). Negative information often is just as important as positive information in aiding understanding and advancing Dialog for both parties. That which is deemed undesirable or considered to be an aversion in the relationship should be treated with as much detail and thought as those things and factors which are desired. Another way to think about positive and negative factors is those factors that may be "benefits" and equally those which may be "detriments" to the work role relationship across the two Triangles.

Each party should consider what they might offer the other party that would be attractive, appreciated, valued and seen as a clear benefit to strengthen their relationship potential. In general, each party should gain more than they give (from their perspective, and compared to their other options), otherwise they have no reason to pursue or keep the relationship.

Key Indicator Elements (see FIG. 8) provide a simple way as to how the parties will determine the state and quality of their Agreement at any point in time in the future. These generally are not created during Preparation, but rather as the parties form Agreement. The parties will discuss and decide on what should be actual "key indicators" that will be used for the work role relationship during the process of Agreement (at the end of Dialog). As shown in FIG. 8, in one embodiment one side of the Key Indicator card has lines 82 where the parties write down what the Key Indicator is. However, the Preparation period is a good time to begin thinking about this and preparing to contribute to the discussion.

Key Indicators need not be complicated. In fact, it is typically best they be as simple as possible. Generally "key indicators" should be considered and applied as to the how each party is doing in satisfying their commitments and obligations to the relationship Agreement. A Key Indicator may or may not be tied directly to any given Element. Often a "key indicator" is a result or "an effect" that is "caused" by an Element. In one embodiment, there are minimums and maximums for these Key Indicator Elements, and each corner of each Personal 84 and Organizational Triangle 86 must be addressed.

During Dialog, when parties have agreed on which Elements will be included in their Agreement, it is important that each party understand the other's Key Indicators of the quality and status of the Agreement. This will be done by both parties working together to create the Key Indicator Elements. It is good for the parties to at least begin thinking about options and methods of doing this beforehand. If possible and reasonable, whatever is used for Key Indicators should be quantifiable and best based upon empirical evidence (though sometimes, one or the other party may need to apply qualitative and subjective parameters, but even these should have a basis). A party may or may not choose to create "proposed" Key Indicator Elements before Dialog, but instead may make a list of their thoughts and ideas beforehand. However, Key Indicators are not determined until both parties decide together what will be included within the work role relationship Agreement.

Preliminary and preparatory research via exploration and discovery may be encouraged. Parties may consider preliminary exploratory investigation and due diligence discussions with each other during Preparation. These explorations should not be for general relationship building discussions, for that will come in Dialog. Rather, these should be for inquiry, research, investigation, learning and the pursuit of better understanding the other party's needs and pertinent circumstances. This can allow each party to be more insightful, better prepared and informed about the other's needs, qualities and perspectives, as well as what they may prefer to offer, any hidden possibilities and qualities, and so forth. "Advance recon" and "intelligence gathering" is a smart thing to do. It makes the inquiring party more aware, accurate, realistic, reasonable and creative in seeking and sustaining a high-quality relationship during Dialog.

Each party should remain prudent, realistic and reasonable in their choices in the creation of their Elements. Elements should generally be feasible and pragmatic in nature, though creativity and innovation are typically beneficial. Elements should be carefully considered so as not to be excessive, frivolous or naïve in nature. Unreasonable or poorly considered Elements may discount and dilute those which are more important and substantive.

Each party should utilize the Common and Specific Elements for full disclosure of expectations, needs and reasonable desires, even if only optional or negotiable. Even if a party does not expect they may reach Agreement on a given Element, they should consider bringing it into Dialog. It may be considered or negotiated against another need of the other party. Nothing should be expected by, and of, parties that has not been articulated or expressed during Dialog in a manner necessary for mutual understanding in the consideration, discussion, negotiation, and ultimately, in the Agreement reached (as well as those Elements that are not in the Agreement).

In contrast to Elements, Durables (see FIG. 9) are intended to reveal each party's perspectives related to personal characteristics that are deemed preferable in the specific work role. Since personal satisfaction has a direct correlation with functional performance, as well as the predictability of a lasting relationship, Durables should be chosen based upon factors, qualities and attributes that may be relevant to personal satisfaction or dissatisfaction as well as characteristics that may point to personal suitability or misfit, in the work role. There may be many correlations to personal Flow zones and Durables.

Figure 9:
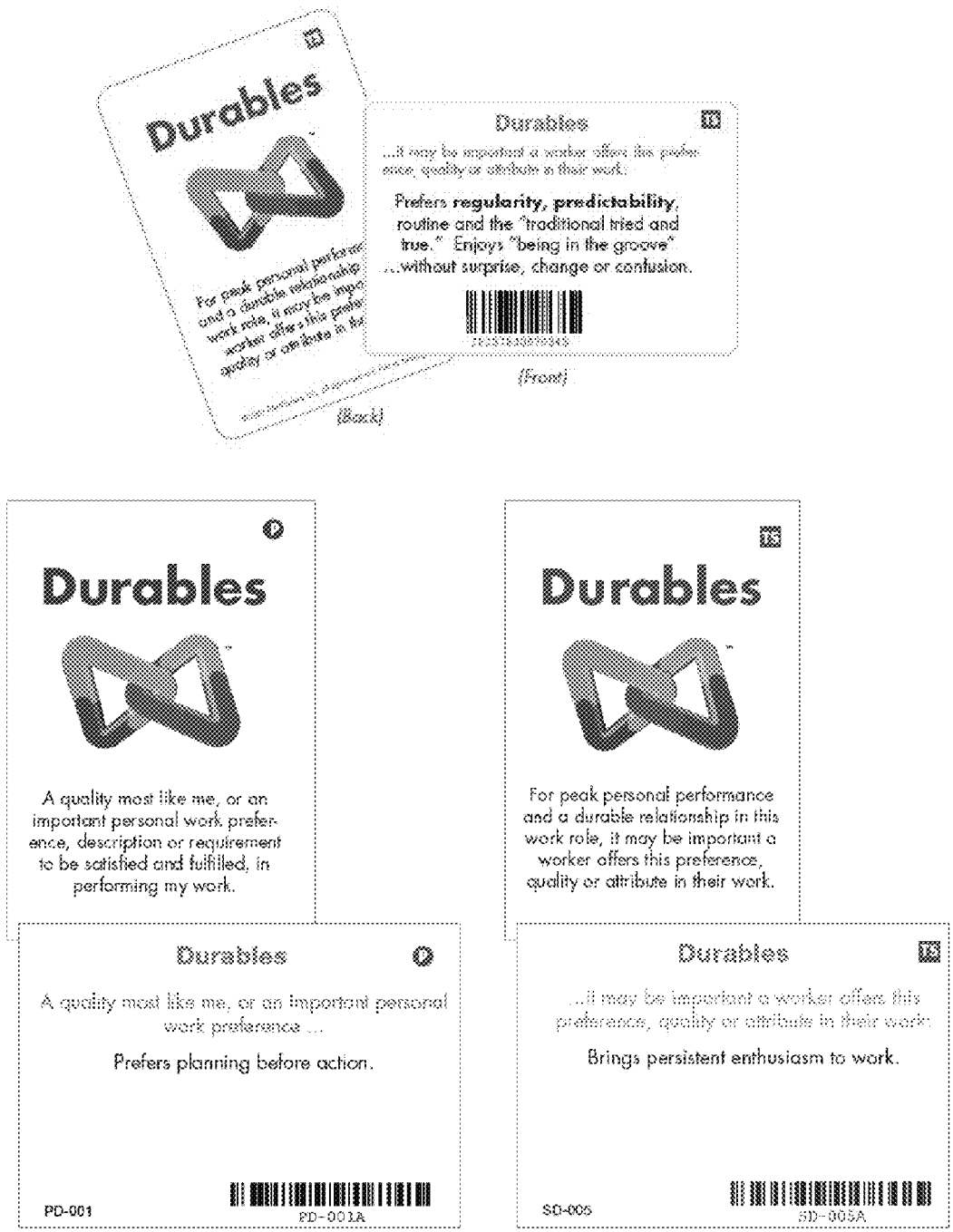
FIG. 9 shows various examples of Durables cards in accordance with one embodiment of the present invention.

Durables, which may be in the form of cards as seen in FIG. 9, should be chosen realistically and pragmatically based upon what is known about the work role, its functions, its social structure and any pertinent element related to its environment. For example, if the work role requires significant "attention to detail" and constant "tolerance of change," they should be selected as Durables (for these will be clues as to the personal qualities that are predictive of a "durable relationship" as well as indicative of personal qualities that may lead to relationship failures.) Both parties will present Durables so as to provide greater perspectives and fuller insights to each party during Dialog. Often adjustments and creative accommodations can be made to address issues and conflicts which may surface.

Durables cannot be created like Specific Elements, but rather must be chosen from the system's standardized inventory, examples of which as shown in FIG. 9. In order to bring potentially important information to the surface, in various exemplary embodiments there are both maximum and minimum requirements as to the number of Durables that each party will be expected to use during Dialog. In one embodiment, there is a minimum of 10 and a maximum of 20.

Durables should not be used to create Commitments. They serve to provide each party with important clues and insights related to the potential durability of the relationship. Durables will often correlate with Flow zones; however, there should not be sole dependence upon this information, for only Elements will be used for the ultimate Agreement. Durables can sometimes predict the likelihood of future danger or problems in a relationship. The value of accurately chosen Durables should become more evident during Dialog. Durables may provide each party with clues as to whether the "Person@Work" may discover satisfaction and fulfillment within the work role (which is essential to both a durable relationship and a sustainable personal performance).

In one embodiment, each party chooses their respective Durables as follows. The Person@Work should choose those Durables that are most like them and/or may best represent their own personal traits, characteristics, qualities, work-related preferences and attributes. The Talent Steward should choose those Durables they found to be important personal characteristics, qualities, preferences and personality traits that are most like workers who are satisfied and fulfilled while providing sustained performance in the work role.

A listing of examples of Common Elements and Durables for one exemplary embodiment are provided below. Other Elements and Durables may be used in other embodiments. The parties may consult such lists during Preparation, as doing so may assist both parties in perusing and considering the possibilities during Preparation.

It is possible that the Preparation activities of creating and/or choosing the Durables and Elements may occur immediately before Dialog. However, doing so may lead to a party that is ill prepared, which could put them at a distinct disadvantage and possibly make a poor impression on the other party. This in turn could lead to a poorly formed, faulty or weak relationship. Each party should carefully consider their Elements by performing substantive Preparation, which could be during the week prior to the Dialog. The system is designed to offer a neutral and equal platform for both parties; however, each party can gain their own advantage by both complete Preparation and ultimately offering performance that the other party appreciates.

In one embodiment, Relationship Performance is a process of constant conversation. As, and when, the work role or personal circumstances change, either party can bring forth a request to return to the Weaver to seek clarification or adjust and modify the work role relationship. Therefore, it is not critical to "go to extremes" in trying to consider and anticipate every future variable or possibility at any given time of Dialog. Changes and the unexpected are inevitable, and when they occur, the parties should come back to the system and modify or remodel the work role relationship. In many organizations, returning to the system periodically will be a common practice for the benefit of both parties.

Each party may create a portable list of all Elements and Durables they have chosen and created beforehand as an aid during Dialog. This should separately describe any applicable Imperatives as well as any preliminary thoughts on Key Indicators. Any other notes of relevance should be included that may serve as guides, references or reminders during Dialog. A party may wish to prioritize this information to ensure those areas of importance are more likely addressed and resolved during Dialog.

Preparation also may include developing empathy and anticipating the differences between the parties having Dialog. As a part of Preparation, each party may take into consideration the possible differences in thinking styles and the implications, personalities, respective bodies of experience and education, and the differing perspectives and points of view so as to have the most effective conversation, appreciation and understanding of the bi-directional information in a productive Weaver Dialog.

In one embodiment, the parties are provided with a checklist 100 (see FIG. 4) to assist throughout the process. The checklist may be used during the Preparation stage to ensure that a party has reviewed and checked each item and signed or initialed that he or she has done so before arriving at Dialog. Any comments or concerns at this stage prior to Dialog, may be noted on the form in the space provided, for this will provide valuable information to both parties.

In the Dialog stage or step, the parties come together after preparation. During Dialog, the combined Elements are offered, discussed, considered, modified, negotiated, accepted and rejected in the manner that is ultimately most suitable and agreeable to both parties. Dialog may be considered a structured conversation focused on forming the best possible relationship Agreement for the mutual benefit of both parties. Dialog usually reveals differing perspectives, offers greater vantages of realities and should constructively promote collaboration, reason and creative compromise. Applicable Elements are advanced to form Commitments and become validated when both parties accept them. Also during the Dialog process, Durables are reviewed, compared and discussed for clues about the prospective durability of the relationship.

Once each party has completed Preparation, or prior to or during Preparation, they schedule a time and place to meet together for Dialog. Dialog takes place using the prepared Elements and Durables with the Dialog & Agreement Board (DAB) 110 (see FIG. 3). The DAB device structures both parties' presentation of their information. It facilitates discussion, collaboration, and negotiation, and ultimately it will serve as an aid to bring both parties to full Agreement through Commitments.

Each party should review the other's checklist 100, if used, to ensure they have adequately prepared (so indicated by their check marks with signature or initials and date). If this is not found to be the case for both, Dialog may be deferred until the checklist (i.e., the Preparation stage) has been completed and signed. Any comments or concerns so noted on the checklist should be discussed, addressed and resolved as applicable and reasonable before beginning Dialog.

Dialog may take place in any suitable location. In one embodiment, Dialog should take place in a private, neutral, quiet setting (without distractions) that is conducive to constructive dialog and contemplation. A neutral "Dialog Room" or otherwise dedicated environment may be used or designed for this important interaction, activity and function.

In any case, there should be no bias or advantage to either party by the nature of the environment that has been chosen. If a dedicated setting is not practical, then the Dialog setting should ensure that neither party has any factors of "home court" advantage. For example, a Talent Steward should not have the edge of their office environment. A party may prefer the unique advantages of having Dialog "off site." Using either party's personal office or work setting is not preferred.

There should be no (or minimal) distractions. The use of cell phones or other devices that could interrupt attention and thought should be discouraged. The ambience of the area should be considered. This may include placing a variety of helpful posters and guides within the environment.

Adequate time should be allowed for thoughtful expression, exploration and creative discussions during Dialog. Generally, there should be no set rules as to elapsed time. Both parties should come to Dialog prepared to communicate and collaborate in a productive and earnest manner. Each should act and interact with serious intent and good will in seeking and resolving a mutually beneficial Agreement with the other. High-quality communications that are open, authentic and comfortable are vital ingredients to Dialog. There should be no time-based pressures. Both parties should appreciate Dialog as important, legitimate, and an excellent investment and use of their time.

Dialog may present a need for multiple Dialogs or "sessions," as opposed to all factors being resolved during one period of time. It is possible the parties may utilize multiple sessions taking place across days or weeks in order to reach a mutually satisfying Agreement (since time for diligent thought, seeking counsel from others, related approval and considerations, subsequent investigations and so forth, may be needed). In one embodiment, Dialog essentially never ends. Dialog's returns and rewards are worth the investment. "Dialog ROI" will be realized each day by both parties as they meet their responsibilities for a successful and satisfying relationship.

Dialog is not a "game of adversaries" or zero-sum competition where one gains or exploits at the other's expense or loss. Rather, Dialog is a process in which each party must seek to optimally satisfy the needs of both parties to realize the best possible, mutually enjoyed, sustainable outcomes from their relationship. If there is prevailing acrimony or lingering ill-feelings, these should be discussed, addressed and resolved first.

In one embodiment, Dialog takes place at the Dialog & Agreement Board (DAB) 110. The overall objective for both parties will be sharing, understanding, considering, resolving and consummating Elements into a complete, mutually satisfying Agreement. Dialog's objective is both parties reaching and subsequently honoring Agreement. Agreement consists of shared Commitments which are specific promises, accountabilities and obligations in the work role relationship. In most cases Dialog should take place in a comfortable, informal sequence. Excessive formality and severe rigor is generally discouraged, but a reasonable step-by-step order is beneficial.

The suggested sequence of Dialog for this exemplary embodiment is as follows:

1. Initial Elements and Durables placement. Before the parties "position" themselves for Dialog at each side of DAB, each party shares their prepared Durables and Elements (chosen or created beforehand) by placing them for display, access and review in the prescribed areas upon DAB. In one embodiment, DAB has three general areas: a central "Commitments" area 120 and two "In Dialog" areas (one for each party) 130, 140. Each of the general areas have marked areas or zones within them. The In Dialog areas, for example, each have several spaces for positive/beneficial and negative/detrimental Elements card placement.

All Elements are placed upon the DAB in the areas so marked with the corresponding markings or symbols of each Element or the Imperatives area. All Imperative Elements (if any) are placed into the common Imperative Commitment area 206 in the center of DAB (there will be time to review and discuss these as needed). All remaining Personal Triangle Elements are placed upon the indicated Personal Triangle (the Talent Steward side) 140 within the In Dialog area (i.e., three designated areas for placement of cards by the first participant representing beneficial or positive elements or characteristics for the work role, one for functional satisfaction 148*a*, one for social satisfaction 148*b*, and one for life effects satisfaction 148*c*, and three designated areas for placement of cards by the first participant representing detrimental or negative elements or characteristics for the work role, one for functional satisfaction 148*d*, one for social satisfaction 148*e*, and one for life effects satisfaction 148*f*. All remaining Organizational Triangle Elements are placed upon the Organizational Triangle (the Person@Work side) 130 within the In Dialog area (i.e., three designated areas for placement of cards by the second participant representing beneficial or positive elements or characteristics for the work role, one for outcomes, deliverables and productivity 138*a*, one for risks 138*b*, and one for resource demands 138*c*, and three designated areas for placement of cards by the second participant representing detrimental or negative elements or characteristics for the work role, one for outcomes, deliverables and productivity 138*d*, one for social risks 138*e*, and one for resource demands 138*f*.

Durables are placed into the other party's "Durables zone" 132, 142 of their In Dialog area. In one embodiment (as described above), each party must submit a minimum of 10 "Durable" Elements into the other party's Durables zone and cannot exceed a maximum of 20. If either party has any confusion or difficulty understanding the information or context of the Elements or Durables, the presenting party should offer explanation, clarifications, modifications and additions to ensure complete understanding.

If both parties have came well prepared, there should be Elements in all areas of both respective Triangles. If this is not true, it may reflect either a lack of preparation, a resistance or reluctance for full expression and full disclosure, a lack of understanding about the Triangle frameworks or a lack of knowledge about the work role or one's self, respectively. Any of these are reasons for concern and should be addressed and potentially remedied before proceeding.

2. Both parties position themselves at the Dialog & Agreement Board as marked. Each party may be seated (though some may prefer standing) and DAB should be positioned between them so as to be easily seen and accessed. Thus, when Dialog begins, each party is in their respective position with all Elements and Durables placed in each other's In Dialog areas 130, 140, or if applicable, in the Imperative Commitment area 206 of the Dialog & Agreement Board 110. Taking position is important since, as in the realities of daily work role activities, each party must apply, leverage and serve the requirements and needs of the other party in a manner to best realize a gain in their own needs and requirements. Accordingly, it is vital that each party accurately and effectively apply and leverage the respective Triangle framework of the other party to ensure they will gain the rewards, results and requirements they seek.

3. Initial Review and Discovery. An adequate period of time should be offered for each party to fully peruse all Elements residing in their area of In Dialog as well as those in the Imperative Commitment area. Either party can ask questions and make notes during this period. Either party can provide further explanations of the Elements they offer or seek. Neither party should "rush" or otherwise try to expedite the other's review. Neither party should assume anything. If there are any doubts or confusion there should be enough discussion for clarity and complete understanding.

If there are any Elements that are placed within the Imperatives area 206 that cause concern, issues or are unacceptable, they should be discussed, and if possible, resolved at this time. This should be done diplomatically with sensitivity to the other party and with good-will and intention toward a positive resolution. Compensating factors and compromise should be considered. However, if a solution or resolution is not possible at this moment that is to both party's full satisfaction, the Element in question should be removed and placed into the "Danger zone" 134, 144 of the party who would not accept it, or rejected it.

Each party will have more influence in "weaving the relationship" by applying Elements on their side of the board. However, they are able to discuss, encourage or informally request the other party's Elements as needed so as to make their best efforts in seeking a high quality and mutually rewarding relationship as they proceed toward Agreement. Discussion is always fine and encouraged during Dialog. Dialog is considerate and creative collaboration for the benefit of both parties. Dialog is structured work role conversation.

Each party may begin consideration of the Durables within both parties' areas at any time during Dialog. Important insights may be gained from congruities or incongruities of Durable Elements that have been placed into a party's area as compared to the Durables that were submitted by that party (into the other party's area). Durables describe and inform what each party believes to be important personal factors for an enduring, satisfying relationship.

In most successful, healthy and long-lasting work role relationships, there tends to be reasonable overlap of the Durables of both parties. This is because they should reveal both parties' perspectives of the optimal personal attributes, qualities and preferences of the work role. The Talent Steward is offering their perspectives about the satisfied person in the work role and the Person@Work is sharing their own preferences, qualities and attributes. Well-designed overlap often is part of a durable relationship offering predictable and consistent satisfaction, performance and yields for both parties. Similarities and differences should be carefully appraised and discussed by the parties. The number and degree of prevailing differences may be "indicators" that predict durability issues that may occur in the relationship (or even predict failures in the relationship).

Both parties should carefully and creatively consider how many aspects of the Durables can be best aligned to satisfy personal needs so as to achieve durability in the role with optimal personal performance. It is typical to not have exact alignment in the Durables and it is normal that the Durables each party offers may not perfectly coincide. Nevertheless, the parties will likely appreciate the inherent meaning and implications that can be derived by carefully considering the Durables. The alignment/misalignment of Durables Elements may have significant relevance to Flow. Durables may have an influence on certain Elements, as situationally applicable. For example, Elements such as functional, social or environmental requirements may be modified to create better congruity and alignment with the preferences and qualities specified in the Durables.

If there is a severe incongruity, or what is considered to be a potentially dangerous misalignment that either party envisions existing within a Durable, and it is not addressed or resolved by discussion, it is suggested that the Durable(s) of concern be placed into the Danger area 134, 144 of the party deemed to be most endangered, at risk or in the greatest jeopardy due to that Durable (so as to raise the concern to a level of acute awareness). Note: this option should only be applied when a Durable is of substantial gravity, danger or importance in the opinion of either or both parties.

Figure 5:
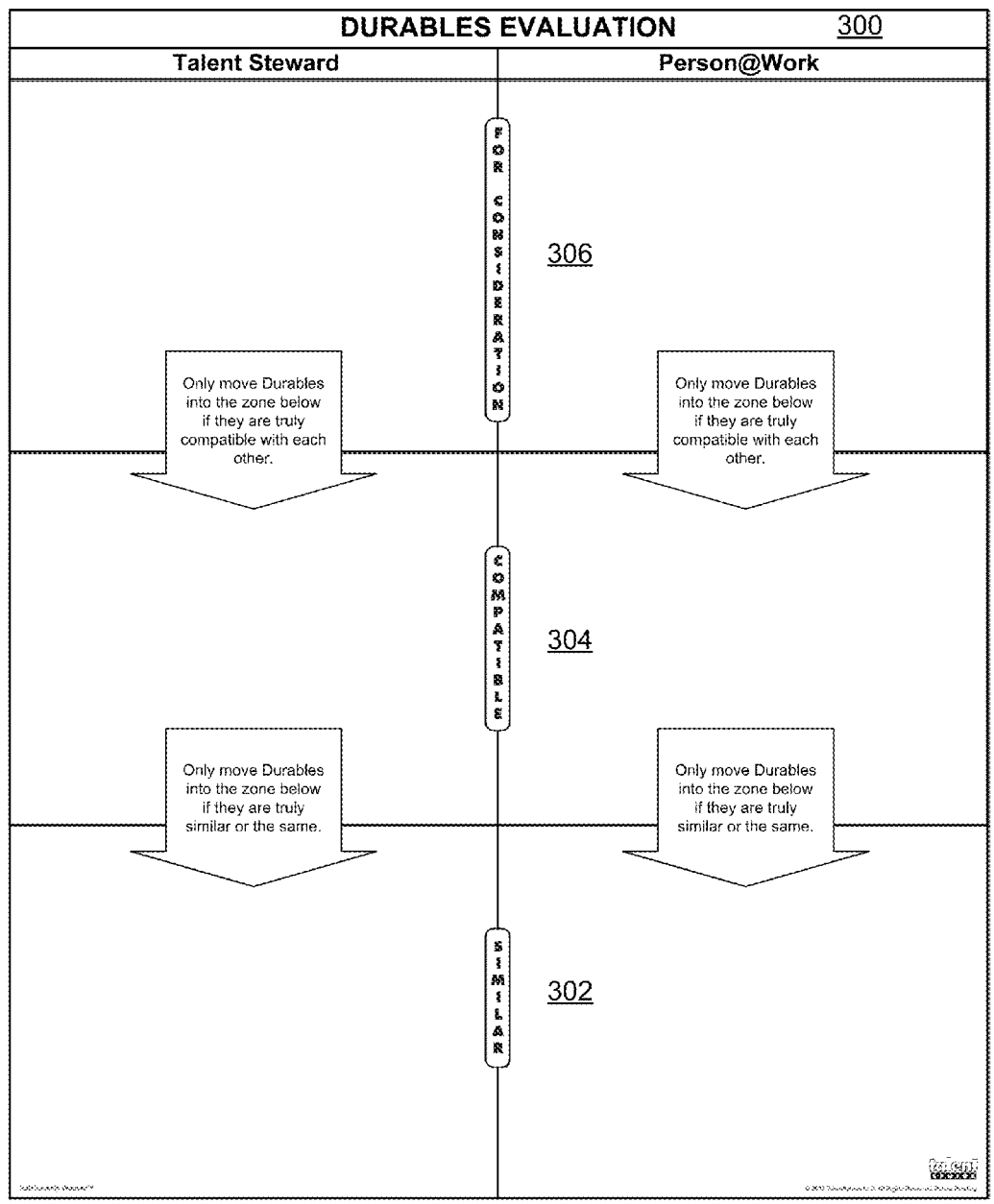
FIG. 5 is a top view of an evaluation mat in accordance with one embodiment of the present invention.

To aid considerations and precipitate revelations that can be derived from Durables choices, an Evaluation Mat 300 as seen in FIG. 5 may be used. Each party distributes selected Durables by side-by-side placement into the three distinct zones to better assess these indicators of relationship durability:

a. Similar 302: Durables that are the same, well-matched or fully congruous.

b. Compatible 304: Durables that are generally aligned, completely suitable, positive, do not conflict with each other or offer potential negative implications.

c. For Consideration 306: Durables that may reveal reasons for concern as to the prospects of relationship durability, perhaps require greater clarification or demand thoughtful reflection prior to agreements or decisions.

Dialog between the Talent Steward and the Person@Work will often assist the placement of Durables in the zones; however, it is generally advised that the Talent Steward's judgment ultimately be used as to proper placement within the three zones (since the work role belongs to the organization).

4. Constructing Commitments. Commitments are the "building blocks" of Agreement. After both parties have competed review and initial discovery, each party chooses the Elements on their side of the Dialog & Agreement Board that are readily acceptable to them and places them into one of five contextual Commitment areas:

a. Personal Triangle-related Commitments 204 (Commitments to the Person from the Organization);

b. Organizational Triangle-related Commitments 208 (Commitments to the Organization from the Person);

c. Imperatives 206 (must haves, non-negotiables, essentials);

d. Tentatives 202 (these typically require specific approval, outside discussions, etc. with others);

e. Contingents 210 (these require prior specific performance or event to occur beforehand, typically from the other party).

In one embodiment, only Elements are used to construct Commitments. Commitments will be used to form Agreement when a point is reached where both parties accept the Commitments as being a complete and accurate representation of that which they desire in the relationship. Generating discussion and understanding that leads to both parties' Commitments in their work role relationship is one of the main objectives of Weaver. The Commitments within the Agreement will serve as the defining structure and guide for the work role relationship. Commitments define each party's responsibilities and accountabilities, as well as their gains and rewards in the work role relationship. Commitments should predictably lead to a healthy, satisfying and successful work role relationship that serves the needs of both parties. Commitments should be made with ample thought, seriousness and reason (for these are the "commitments" that each party offers to the other in the work role each day, the exception being the occurrence of unforeseen circumstances or events that are out of the control of the parties).

The five different types of Commitments are designed to inform, to structure, add context, precipitate discussion and aid each party's awareness of the other's perspective. Commitments provide the threads for weaving a strong, productive relationship. All Commitments carry the same ultimate weight and importance in the Agreement.

In the beginning stages of Dialog, each party should be placing all those Elements that they need or desire the other to perform or offer to the relationship into Commitments. However, it will not be a "valid Commitment" until the other party accepts it as such. During the same time, each party may prudently offer Elements into Commitments that are intended to compensate or serve the needs of the other party in return for what they ask of that party. This may be viewed as "offering Commitments." If desired Elements happen to be on the other party's side of the DAB 110, a party may "ask" that they be placed in an applicable Commitment area 202, 204, 206, 208, 210. The other party does not have to do this and does so only at their discretion. This may be viewed as "informally requesting Commitments." A formal, more powerful, request is referred to as a "Call" and is described below.

There may be various problems, misunderstandings, unintended negative consequences or excessive Commitments caused by one party simply reaching into the other party's side of the DAB for the purpose of selecting and moving Elements into Commitments, even if the other party (the holding party) has no objections. It is important that any Element held on one party's side of the DAB, regardless of who created it originally, be specifically and explicitly requested as a Commitment through either Dialog or by Call, and in response, the Element then should be thoughtfully and consciously considered, offered or rejected by the holding party. If it is not offered in response, it should be placed in the Danger area 134, 144 of the holding party, unless the requesting party agrees to forego that placement and cancel their request. It is important to remember that all Elements, regardless of their placement, can be reviewed and perused by either party at any time, and both are encouraged to do so.

All Elements that each party has remaining which are deemed to be "possibilities" or "options" for the relationship or perhaps open for discussion and negotiations, remain in the "In Dialog" zone. This is an ideal area for fully exposing options and alternatives, exploratory conversation and creative remedies that may exist in the residing Elements. Anytime during Dialog, either party may move Elements into or out of the Commitment areas and the In Dialog zone. While In Dialog, this implies that an Element can be a means to carefully and thoughtfully reveal difficult issues, dangling factors, concerns and issues to precipitate needed awareness by the other party (without having to orally initiate the topic). Any Element In Dialog or that is placed within Commitments should be positioned to be easily seen and accessed by the other party. Either party can review the Elements within Commitments or within the other party's In Dialog zone at any time.

Generally, most Elements placed into Commitments will reside in the respective Personal Triangle or Organizational Triangle Commitment zones. These are the general Commitments that describe the Personal and Organizational gains from the relationship respectively.

Only essential Elements and those that are absolutely non-negotiable from your point of view should be placed in the Imperative Commitment zone 206. If the Element is not an absolute essential requirement to the party's work role relationship, it should generally not be placed in the Imperative area. (Key Indicator Elements will also later be placed in the Imperative area.)

In considering Commitments, each party may consider that both parties should gain more value from the relationship than they give. The greater this difference of "gain" versus "give" is seen to be in the minds of each party, the stronger the work role relationship. The perimeter of the Dialog & Agreement Board is a reminder that each party typically has other options available to them beyond the forming or sustaining of this relationship.

Any type or form of negative Element, whether Common or Specific, should be used in the same manner to form Commitments as are the positive Elements. The use of a negative Element simply indicates and informs the other party of factors that are deemed to be unacceptable or undesirable in the work role relationship. When the other party accepts a negative Element placed into a Commitment area (validates), both parties are committing to each other that this factor is not to be a part of their work role relationship. The use and application of negative Elements is as important as positive Elements, since they may convey important guidance and may establish vital "partitions," "boundaries," parameters and protections for the submitting party.

If either party cannot accept the presence of an Element that has been placed within a Commitment, it must be removed. Generally there should be appropriate and constructive discussion as to reasons prior to removal. Compensations, compromises or negotiations may be attempted as applicable.

If an Element is removed from the Imperative Commitment area, it is placed into the "Danger" zone of the party who refused to accept it. If an Element is removed from any other Commitment, it is placed back into the submitting party's "In Dialog" zone.

As each party makes Commitments, it is likely that there may be similar or overlapping Elements, which are placed in the same or different Commitments. This is fine. As long as both parties fully understand and totally accept the Elements placed into Commitments, regardless of quantity, duplications, or qualities, this is acceptable. The main purpose of Commitments is to resolve and promise what each party agreed to gain and to give to the work role relationship.

Changes, additions and modifications of Elements throughout Dialog are fine as long as they serve communication and collaboration. At any time during Dialog, new Elements can be created and applied by either party, then placed into the appropriate area. Though this should not be overdone, it is typical and reasonable that Dialog will spur new thoughts or inadvertent omissions. Also, existing Specific Elements can be modified for clarity or to respond to other needs. Elements can be moved into, or out of, Commitment areas as the Dialog progresses, including the Imperative area, until the point of Agreement. However, in no case should changes, modifications or movements be done in a subversive, hidden or in a manner of ill intent or deception. It is advised that, in all cases, changes, modifications and movements as applicable, be done in full disclosure and with adequate discussion.

Figure 10:
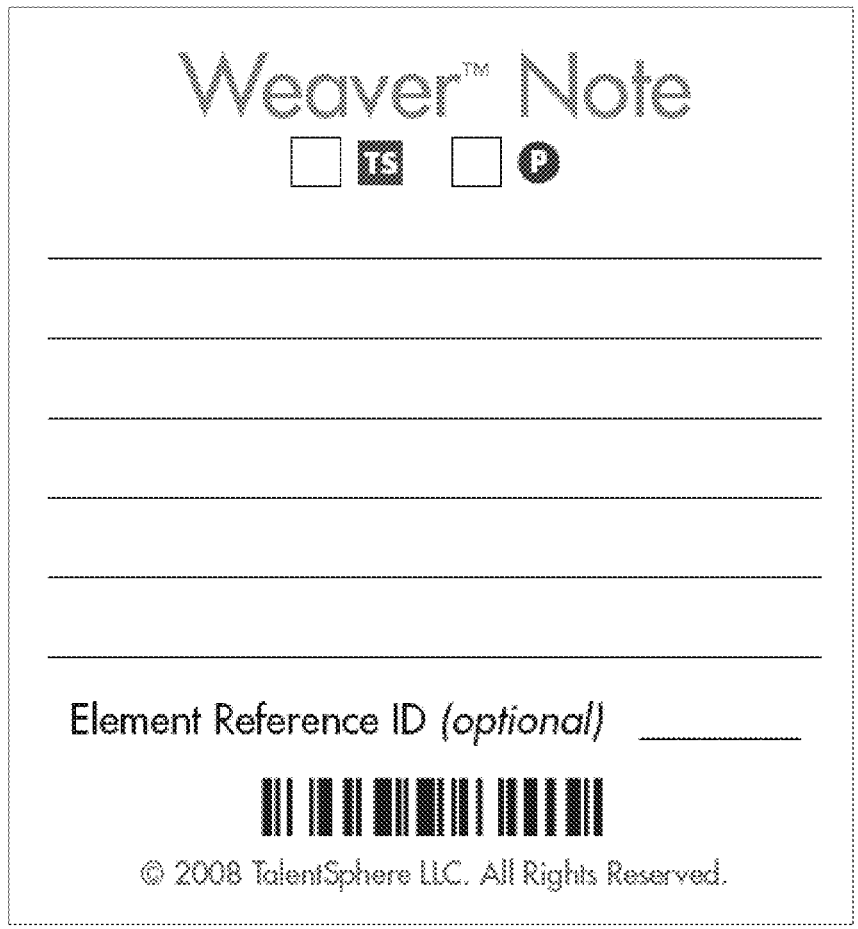
FIG. 10 shows a view of a note in accordance with one embodiment of the present invention.

Notes may be made using the system notepad (see FIG. 10) or other form of sticky notes. These sticky notes should be attached to the Element so that the information contained on them may become part of the documented Agreement. Notes may be particularly useful with Tentative and Contingent Commitments to add necessary clarity or context to those Elements.

5. Validating Commitments. Any Element placed into a Commitment is not valid until the other party accepts it. Once the other party has accepted it, it is considered "valid." Both parties may agree on a simple method or mechanism to distinguish validated Elements in each Commitment zone from those not yet validated. Either party may elect to validate or withhold validation on Elements in Commitments until later in Dialog.

A party should not accept any Commitment that they are not confident they can produce, reliably offer or perform in a satisfactory manner for the other party. If there is any doubt or concern, those Elements should be placed into either the Tentative or Contingent Commitment areas 202, 210 as applicable. It should then be clearly defined as to what needs to take place or what needs to be in place, or put in place, to make the Commitment be resolved dependably. Tentative and Contingent Commitments should be Dialoged carefully, and not used as a means of avoidance, diversion, distraction or an alternative to discussion and resolution of important matters and issues. Any Tentative or Contingent Commitment must have a finite time, event or action that brings about their resolution. Document these factors using either the Specific Element or attaching a Weaver note. Tentative and Contingent Commitments should be as specific as possible in order to be equally considered as their own form and context of firm commitment. If this is not possible, the Element must remain or be placed into the In Dialog zone. Every Element within every Commitment must be understood and reliable to both parties (with the exception of unforeseen circumstances). To be deemed as valid, all Elements placed into any Commitment must be understood, accepted and agreed to by both parties.

Every Element within a Commitment describing a work role function that the worker is being asked to perform should be accompanied by other information or Elements that completely and clearly define each party's responsibilities for peak performance of the function.

No work role should contain more Elements than one person can reasonably perform. Parties should each consider and accept Elements in Commitments with a degree of pragmatic realism, as opposed to unrealistic optimism. There is great danger in setting either party up for future disappointment, frustration or disillusion due to broken or unfulfilled Commitments.

As Dialog takes place, Elements can be added to, removed from, or shifted between the Commitments as applicable. Elements themselves can be modified or created anew during Dialog. This dynamic movement can take place to reflect discussions and negotiations until a point of final Agreement concluding this Dialog event. After Agreement, movement or changes are generally not acceptable without a return to new Dialog.

Dialog will inevitably bring forth pertinent questions. Explanations, discussion and negotiation should be well underway between the parties and should continue throughout. Either party can encourage the other party to move Elements into Commitment zones or In Dialog zones as applicable and desirable. As in all matters of importance, it should be accepted that there may be constructive contention, argument, debate and negotiations. The key points in this regard are to keep all topical debate constructive and maintain respect for the other party and the process of Dialog.

Dialog typically evolves into each party considering all outstanding Elements within the other party's area that are not presently in Commitment areas, especially those which they personally prepared, brought and submitted to the Dialog (since these are Elements considered as requirements or desires the party seeks from the work role relationship). This review can be approached by perusing the list created as a part of Dialog Preparation, or by reviewing the Elements placed into the other party's area that may now be either In Dialog, or otherwise unattended/unaddressed. Should there be any confusion as to who submitted what, each party's submitted Elements can be identified respectively by the "TS" or "P" marks. Elements will often remain within the "In Dialog" area after Dialog and Agreement. These should be documented and may be helpful for future sessions.

6. Calls. As the Dialog further matures, each party may now "Call" Elements they consider important which have not been placed into Commitments on the other party's side of the Dialog & Agreement Board. Often Calls will be used to bring those items that a party desires or needs from the work role relationship which have not been offered or volunteered to this point by the other party. Doing so is at the option and discretion of each party, but generally should not be exercised before this maturing point of Dialog. Elements that are Calls at this later point in Dialog may also be considered as vital, essential, or a must-have requirements (for the merit, existence or sustainability of the relationship), thus they may also go into the Imperative Commitment area. There may be factors within the relationship that become "non-negotiable" due to the process of Dialog.

Calls can either be accepted or opposed by the other party. In one exemplary embodiment, the other party may "Accept" the Call by placing the Element into the proper Commitment zone. If there is disagreement as to which Commitment zone it should be placed, the party that Called determines placement. Alternatively, the other party may "Oppose" the Call by placing the Element into their own Danger zone.

Any Elements or Durables residing in a party's Danger zone are indicative of serious issues in forming or sustaining a relationship if not addressed in a timely manner. If all Elements and Durables residing in the two Danger zones are not fully resolved by discussion and negotiations and removed to another appropriate area, this may indicate a potential failure in the relationship or indicate/predict the relationship is in extreme jeopardy (unless the two parties can creatively explore other approaches, modifications or compensating Elements, carefully reconsider a "Call" or "Imperative" negotiate or otherwise reach a mutually satisfactory compromise). It is always advised that reasonable and creative attempts at modifications, adjustments and accommodations be considered and applied if possible. However, realism, pragmatism and truth should prevail and rationalization, denial or marginalization of potentially serious factors should be avoided.

During the Agreement stage or step, Commitments created during Dialog serve as "threads" that are woven or combined to collectively form an Agreement. Agreement is achieved when the quality and quantity of Commitments are in place to satisfy the needs of both parties for a rewarding and durable relationship. Agreement becomes "the whole cloth" that defines and guides a durable, successful work role relationship. Agreements are documented to be the reference and set the parameters for all respective performance responsibilities, obligations and expectations in the relationship.

Dialog concludes by Elements being distributed within the five Commitment zones so that all respective needs, considerations, and gains by both parties from the work role relationship are in place, fully understood and agreed upon. At Agreement, all Elements in all Commitments must be validated. Any Elements not validated must be removed and placed into appropriate areas, including the Danger zone if applicable.

Key Indicator Elements should be a part of the Agreement. Key Indicators can be discussed at anytime during Dialog. However, only when the Agreement stage is reached will both parties know what will be included in the Agreement. They can then consider and plan what should be measured as to the how, when, where, and reporting means, etc. It is vital that as Dialog progresses and Commitments are made (or not), each party seek clear understanding of all Elements in place, and especially those which are agreed. Dialog should be substantive and extensive to prevent any confusion, doubts, assumptions or misunderstanding in the future. Accordingly, all important factors, such as each work role function should be clear as to the responsibilities each party has in its performance, thus there should be clear information as to how each party's performance on the basis of the Agreement will be measured. This is the purpose of Key Indicator Elements.

Generally Key Indicators should be done in the simplest, most reliable and pragmatic manner possible. If the two parties desire the relationship they are designing, they should ensure respective understanding today and tomorrow by putting measurement means in place to ensure that the results they seek can be determined and will be realized. Key Indicators should clearly and simply reveal whether each party is performing their respective responsibilities and obligations (or not) to their Agreement. An indicator may be something that serves as a simple way to define that respective expectations are, or are not, being met. Everything need not and should not be measured. Excessive Key Indicators can lead to waste, confusion, noise and distraction. However, in all work role relationships there will be certain results, outcomes, observations or parameters that directly relate to the relationship being acceptable or not. This must be determinable and agreeable to both parties for their respective monitoring, judgment and actions, if applicable. The Talent Steward will often tie Key Indicators to quantifiable functional performance or results, derivatives and outcomes that are realized, or not, from functional performance. To focus and regulate Key Indicators there should be a minimum of one Key Indicator per Triangle corner for each party's respective Triangle. In one exemplary embodiment, there should be no more than three Key Indicators per respective Triangle corner.

Once a point is reached in Dialog where Commitments are complete and validated, both parties should discuss and resolve the Key Indicators that should be in place to satisfy both parties' needs for determining the state, status and condition of the relationship in the future. Each Key Indicator should be constructed with an appropriate Key Indicator Element. Key Indicator Elements can only be based on Elements in place or a result, derivative or outcome that is directly created or produced by them. Once these Key Indicators are in place, each must be validated by both parties.

It is normal that all Elements will not be included in the Commitments and many will remain in the In Dialog area. These should be perused again, for a few of these may point to, or provide clues to, dangling factors, issues, or concerns that have not been adequately addressed. In some cases, most Elements may not have been used for Agreement (since some parties can arrive with an extensive "wish list"). In any case, those Elements that remain In Dialog also offer important future information and understanding. For example, those remaining convey that which will not be a part of the relationship Agreement and thus will not, and should not be expected by either party.

Negotiation take place until both parties are satisfied and have reached full Agreement as to the five Commitment zones and the Elements within each of them. Both parties must fully accept and commit to their respective promises, accountabilities, responsibilities and obligations to each other, per the parameters and guidance of the Elements within the Commitments. These Elements establish the respective definition, reference, parameters for rewards and expectations for a satisfying and durable relationship.

A party can add, change or remove Elements from any Commitment at any time prior to final Agreement, but not thereafter. Any changes after Agreement dictates the need for "new Dialog." Nothing should be expected by, and of, parties in the work role relationship that has not been articulated or expressed in a manner necessary for mutual understanding and ultimately, Agreement. As, and when, circumstances change, either party can request a return to the Dialog & Agreement Board.

At the point of full Agreement, there should be no Elements or Durables residing in either Danger zone. These should be discussed and, if applicable, creatively resolved to the satisfaction of both parties. If comprehensive Agreement cannot be reached, both parties are at risk of loss and damage to their work role relationship. The existing or potential relationship is imperiled. In such a situation, each party should strive to creatively seek all possible alternatives and options toward a negotiated Agreement. It may benefit them to bring in a qualified guide to serve as a facilitator or arbitrator. At a minimum, a recess or break is advised for each party to seek counsel, answers, options and solutions to solving or preventing this Danger.

Any Elements residing in Tentative and Contingent Commitments 202, 210 should be resolved with full clarity and mutual Agreement as to how all outstanding or unresolved aspects and factors will be specifically addressed and when resolution of each will be expected, as applicable.

Final Agreement should be so noted by a congratulatory and promise-binding handshake between the parties. Once this state of full Agreement is accomplished it puts both parties on the path to a rewarding relationship.

The checklist 100 may be used by both parties as an aid throughout Dialog and Agreement phases. Any comments, ideas or concerns related to the Dialog or Agreement phases should be so noted on the checklist. Each checklist should then be placed on DAB for inclusion in documentation.

The parties should not move or remove any information or component that is on the DAB until full capture and documentation has been diligently and carefully completed (this may be accomplished via manual recording of information or automatic means, such as a software application program). Capture and documentation is the responsibility of the Steward and Organization. Afterwards, all information should be distributed to both parties for their future guidance and reference as to their Agreement.

In one exemplary embodiment, the following points should be considered by the users:

1. Each party should always remain purposeful, collaborative and constructive toward building a successful, lasting relationship.

2. New Elements can be added, created and applied by either party during Dialog as necessary for reaching full Agreement.

3. As the perimeter of the Dialog & Agreement Board indicates, each party is encouraged to humbly and realistically remember that the other party generally has other marketplaces, options and alternatives.

4. In certain situations, a trained guide or arbitrator can be useful, especially during periods of difficult discussion, stalemates, antagonistic dialog or during confusing or challenging aspects of Preparation. "Time-outs," "recesses" and cooling off periods may be useful if Dialog gets too intense, heated, unconstructive or acrimonious. This may be a few minutes, hours, days or weeks as the situation dictates.

5. There can be value in using the system described herein in management training or career management development as a simulation platform.

6. There can be value in applying this platform in both the hiring interview and the on-boarding process. In such cases, the candidate must be availed preparation time, resources and assistance as needed.

7. There may be value in the constituents "switching" or "reversing" roles while Dialoging to immerse them into the other role for "full empathy."

8. The organization may elect to create specific Elements, per WRYM Work Role Design, and distribute to Talent Stewards for usage in their Dialoging.

9. Dialog can be used as a very effective survey and audit medium of the needs and perspectives of the workers, management, candidate and recruiters.

10. In most situations, it is generally recommended that the early stages and events of Dialog with new parties are somewhat more relaxed, casual, informative and possess an instructive nature. This may be seen as "demos," "trials" or "practice Dialog." As experience and mastery progresses, the Dialog should increase in its seriousness and gravity between the parties, becoming a constant guiding reference point for their relationships.

Healthy work role relations can only be achieved by the parties honoring their Agreement in the work place each day. The Elements within each of the five Commitments will serve as a structure of expectations and instructive guides for the promises, responsibilities and performance obligations of the respective parties. The Elements of gain accepted by each party in the five Commitments are their rewards of Relationship Performance. These rewards are only gained or won by meeting and exceeding the performance expectations of every Element that was accepted and agreed upon by each party.

Documentation is important. Both parties should have full documentation of Dialog information for reference. Capture of information is available by automated entry (such as by reading a barcode on each Element or other components, using a software application) coupled with the manual entry of applicable specific information, identifications and circumstances through the usage of Performance Harvester and Yields software. Unless otherwise indicated, this information should be treated as confidential and private, unless both parties agree to sharing, distribution and other uses.

Key Indicators that were agreed upon, along with applicable feedback, should take place both periodically (generally not to exceed one month), plus on an "as-needed" basis as required by either party.

Information gained by the application of the system described should be applied as a constant point of reference and guide to successful relations by both parties. No substantive or chronic expectations should be made by either party in a work role relationship if it was not included and agreed upon as part of a successfully completed Agreement. Any new needs, including modifications or changes to the work role relationship, should be made by returning to the system.

The system may be used to keep the relationship healthy and predictable, and when needed, to repair, strengthen and improve it. It may be returned to in times of relationship issues, problems, concerns or needs of remedy, discussion and clarification. There is benefit in periodically returning to Dialog for validations and feedback (this should generally not exceed a six month interval). Durables may be applied for a variety of increased understandings, assessments, evaluations, surveys and research by both parties.

The system may be employed in a variety of formats, including physical or electronic form. In other embodiments, the game may be used in situations wherever two parties with reciprocal criteria for relationships must find paths and grounds for agreement, such as, but not limited to, marriage, business, political, and disparate communities circumstances.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

I claim:

1. A system for negotiating a work role relationship between two participants, comprising:
   a first set of cards for a first participant;
   a second set of cards for a second participant, wherein the first and second sets of cards are not identical;
   a Dialog and Agreement Board with a first end, a second end, and a center section, the first end containing a first in-dialog area for the first participant and the second end containing a second in-dialog area for the second participant, each in-dialog area containing eight designated areas participants place one or more cards representing elements or parts of the work role relationship or personal characteristics related to the work role, wherein each designated area is adapted for placement of cards from only one of the participants;
   wherein the first in-dialog area comprises
      first through third designated areas adapted for placement of cards by the first participant representing beneficial or positive elements or characteristics for the work role, the first designated area for functional satisfaction, the second designated area for social satisfaction, and the third designated area for life effects satisfaction,
      fourth through sixth designated areas adapted for placement of cards by the first participant representing detrimental or negative elements or characteristics for the work role, the fourth designated area for functional satisfaction, the fifth designated area for social satisfaction, and the sixth designated area for life effects satisfaction,
      a seventh designated area adapted for placement of cards by the first participant representing dangerous elements that are rejected by the first participant, and an eighth designated area adapted for placement of cards by the second participant representing durable elements to the second participant;

wherein the second in-dialog area comprises ninth through eleventh designated areas adapted for placement of cards by the second participant representing beneficial or positive elements or characteristics for the work role, the ninth designated area for outcomes, deliverables and productivity, the tenth designated area for risks, and the eleventh designated area for resource demands, twelfth through fourteenth designated areas adapted for placement of cards by the second participant representing detrimental or negative elements or characteristics for the work role, the twelfth designated area for outcomes, deliverables and productivity, the thirteenth designated area for risks, and the fourteenth designated area for resource demands, a fifteenth designated area adapted for placement of cards by the second participant representing dangerous elements that are rejected by the second participant, and a sixteenth designated area adapted for placement of cards by the first participant representing durable elements to the first participant;

further wherein the center area comprises five separate designated center areas adapted for placement of cards by either of the participants, said designated center areas comprising a first designated center area adapted for placing cards representing elements that a participant can tentatively commit to, a second center designated area adapted for placing cards representing elements that a participant can agree to on a contingent basis, a third center designated area adapted for placing cards representing elements where there is a commitment from the first participant to the second participant; a fourth center designated area adapted for placing cards representing elements where there is a commitment from the second participant to the first participant, and a fifth designated center area adapted for placing cards representing elements that a participant considers to be imperative or non-negotiable.

2. The system of claim 1, further wherein said first and second sets of cards comprise cards representing pre-established common elements of a work role relationship.

3. The system of claim 1, further wherein said first and second sets of cards comprise cards on which a participant can write specific information regarding a work role relationship.

4. The system of claim 1, wherein the cards are marked with symbols or icons representing the participant who initially placed that card on the Dialog and Agreement Board.

5. The system of claim 1, wherein each card is marked with a distinctive bar code.

6. The system of claim 1, further comprising one or more checklists used by each participant in preparing for use of the Dialog and Agreement Board.

7. The system of claim 1, further comprising an evaluation mat with six sections arranged in a grid comprising two columns and three rows, the first column corresponding to the first participant and the second column corresponding to the second participant, and the rows adapted to indicate the degree of similarity or compatibility between a first card representing a characteristic selected by the first participant and a second card representing a characteristic selected by the second participant.

* * * * *